United States Patent [19]

Swanberg et al.

[11] Patent Number: 5,699,502

[45] Date of Patent: Dec. 16, 1997

[54] SYSTEM AND METHOD FOR MANAGING COMPUTER SYSTEM FAULTS

[75] Inventors: Randal Craig Swanberg, Round Rock; Michael Stephen Williams, Austin, both of Tex.

[73] Assignee: International Business Machines Corporation, Armonk, N.Y.

[21] Appl. No.: 536,037

[22] Filed: Sep. 29, 1995

[51] Int. Cl.[6] .................................................. G06F 11/00
[52] U.S. Cl. ................................. 395/182.22; 371/5.5
[58] Field of Search ......................... 395/182.22, 182.2, 395/750, 184.01, 182.08, 182.02, 182.12, 182.09, 183.21

[56] References Cited

U.S. PATENT DOCUMENTS

| | | | |
|---|---|---|---|
| 4,757,505 | 7/1988 | Marrington et al. | 395/182.2 |
| 4,868,832 | 9/1989 | Marrington et al. | 395/182.2 |
| 4,985,695 | 1/1991 | Wilkinson et al. | 340/571 |
| 5,159,685 | 10/1992 | Kung | 395/183.02 |
| 5,161,158 | 11/1992 | Charkravarty et al. | 395/183.02 |
| 5,214,653 | 5/1993 | Elliot, Jr. et al. | 395/183.02 |
| 5,337,320 | 8/1994 | Kung | 395/183.02 |
| 5,359,728 | 10/1994 | Rusnack et al. | 395/182.03 |
| 5,363,503 | 11/1994 | Gleeson . | |
| 5,388,189 | 2/1995 | Kung | 395/50 |
| 5,416,921 | 5/1995 | Frey et al. . | |
| 5,430,875 | 7/1995 | Ma . | |

Primary Examiner—Ly V. Hua
Attorney, Agent, or Firm—Robert M. Carwell

[57] ABSTRACT

Hardware subsystems detect fault condition events in a computer system. The hardware determines, in response to each detected event, an appropriate corresponding behavior. A message is then communicated to the operating system identifying the desired responsive behavior. In response, the operating system executes appropriate preselected subroutines to cause the desired responsive behavior. New hardware, fault conditions, and behaviors may thereby be supported without necessitating corresponding modification and testing of the operating system software per se. Desired behavior of the operating system responsive to new hardware subsystems or system modifications are communicated to the operating system as behavior messages rather than events. The operating system is thereby not burdened with maintaining an appropriate behavioral responses corresponding to widely ranging and changing events associated with a plurality of different hardware systems supported by the same operating system.

20 Claims, 2 Drawing Sheets

SYSTEM AND METHOD FOR MANAGING COMPUTER SYSTEM FAULTS

TECHNICAL FIELD

This invention relates to fault handling in computer systems and, more particularly, to systems and methods for efficiently managing system shutdowns in response to hardware faults.

BACKGROUND OF THE INVENTION

In the design of increasingly complex modern computer systems, one important aspect of architecture is the provision for handling of malfunctions. These malfunctions can be quite numerous and varied in scope, ranging from cooling system failures to power supply failures or the like, and may be thought of generically as "events".

Once these events are detected in the hardware, it is necessary that they, in turn, cause appropriate behavior or actions to be taken in order to prevent or minimize loss of data, damage to the system, and other problems associated with these undesirable events. Such behaviors, in like manner to events, may also be quite numerous, varied, and complex and are functionally dependent upon the events detected and the particular hardware systems with which such events associated. Representative examples of such appropriate event-triggered behaviors are warnings to the system's user of the detected condition, and automatic system shutdown. These desired behaviors may further include preserving data integrity and file systems for example when faults occur before a transaction has completed.

The conventional approach in designing systems which can effectively handle hardware malfunctions is to first provide, in the hardware, mechanisms for detecting these various events. Indications of these detected events are then communicated to the software, and specifically to the operating system, for handling. The operating system is designed to receive and process the event indicators and, fashion a series of appropriate responsive behaviors tailored to the detected events.

In the early stages of development of such systems, the foregoing approach appeared to work quite well, primarily because the computers themselves were relatively simple. Often, the detected events were very limited in number and in their interrelationship and complexity, as were the resultant desired behaviors. For example, a simple system might just detect a cooling fan failure, which, in turn, would simply evoke the execution of an immediate power off routine by the operating system.

However, in the further development of computer technology, hardware systems have become quite complex as have the number and types of event faults which must be detected and the resultant behaviors which must be triggered by the operating system.

For example, heretofore a manufacturer might have had only a fairly limited hardware product set to deal with comprised of a few low end computers. However, now that same manufacturer might be dealing with a wide hardware mix of products. They might range from relatively simple desktop client PCs or workstations, to highly complex integrated server systems involving multiple CPUs, racks, and cabinets housing multiple disk drives, adapter boards, other peripheral devices, etc., each having associated therewith their own power supplies and cooling failure points.

As a result of the foregoing increased number and complexity of hardware systems in need of fault support, not only was there a concomitant increase in the sheer number of different events which must be detected, but the problem became more complex in determining the appropriate behavior from these events in a single operating system supporting multiple hardware platforms.

In response to the need to reduce the complexity of fault handling systems, the industry attempted to bring artificial intelligence and expert system technology to bear on the situation. In such systems, artificial intelligence engines were provided to perform fault handling of device errors. This essentially involved learning about events, alarms, etc., and thereafter, in an adaptive or intelligent fashion, determining what needed to be done to remedy the fault.

While these prior art attempts simplified the task of interpreting the various events and alarms, one serious drawback was that further operating system processing was nevertheless required in order to determine the appropriate responsive behavior to take. Thus, these systems essentially remained "event" notification systems. Although they simplified to some extent the combinatorial problems and tasks of determining appropriate fault behavior associated with increasingly complex hardware systems and combinations thereof, the burden nevertheless continued to devolve upon the operating system per se to process these events and to fashion an appropriate behavior. For reasons previously set forth, this burden being placed upon developers of the operating system has rapidly become unmanageable in handling the vast permutations and combinations of hardware systems and associated events in modern day computer systems.

A few examples will serve to underscore the complexity of the problem. In one instance, presence of a certain flag bit in a register might indicate, with respect to a particular piece of hardware, that a cooling fan has failed. In such a case, for that particular hardware the appropriate behavior might be to effect an instantaneous power shutdown. However, in another piece of hardware this same bit might correspond to failure of a power supply in a system which has a redundant power supply. In this instance effecting an immediate power shutdown would not only be inappropriate but highly undesirable. In conventional systems, the task of identifying which behavior was appropriate might not only require sensing the event flag itself but also determining the particular hardware system from which the event originated in order to select and effect the appropriate behavior. The foregoing tasks were relegated to the operating system in prior systems.

As the number of such events and systems which a given operating system was to support grew, the problems in providing and maintaining the function of fashioning the appropriate behavior in the operating system itself per se, likewise grew. For every new hardware modification resulting in a new event (which, in turn, required a particular fault behavior), it was expected that the operating system itself would have to be altered to account for this. The burden of maintaining a single operating system (for economic reasons) which was required to support multiple "legacy" hardware platforms as well as newly added hardware, has resulted in an expense and complexity in maintaining such operating systems that in many instances became unmanageable and impractical.

Even when an operating system vendor could successfully manage to keep pace with the rapidly increasing number of events to be detected and the resulting behavior, when the operating system was relegated to determining such appropriate behavior, this led to additional problems.

For example, with the advent of an increasing number of original equipment manufacturers desirous of providing their own proprietary adaptation or "value add" to operating systems, they too became saddled with the burden of ensuring that the operating system kept pace with the additions and changes in the hardware which gives rise to the necessary new behaviors. Dependent upon their value add to the hardware, such OEM manufacturers might, for example, require a different set or type of behaviors than that selected by the original operating system vendor. However, such a manufacturer may not have the capability or resources to develop and test new operating system kernel code which, given a set of events, could determine from this the appropriate behavior for those new events.

An OEM manufacturer would, therefore, be very desirous of a simpler method whereby they could provide such value-add hardware modifications yet still efficiently ensure that the necessary new modifications to the original system behavior (as defined by the original operating system vendor could be economically implemented). However, as previously described, with the current systems (wherein responsibility for selecting appropriate behavior as a function of detected events was embedded in the operating system), the level of complexity in so modifying the operating system rendered it effecting impossible, as a practical matter, effectively impossible for such OEMs to provide for these custom behaviors.

From the foregoing, it will be readily apparent that a computerized fault management system was highly desirable which could reduce the burden of maintaining the operating system with which the hardware systems functioned. Such an improved system was further desired which would easily permit the addition of events and resulting behaviors as the hardware systems changed and increased in complexity, thereby providing for increased hardware design flexibility.

It was yet a further object of the invention to place the decisions relating to selecting the appropriate event-driven behavior of a fault management system in the hands of the particular hardware designers rather than the designers and maintainers of the operating system, inasmuch as such hardware architects were most knowledgeable about these events and the necessary behavior which they should dictate.

Yet a further object of the invention was to increase operating system portability, wherein the operating system could be more modular and object-oriented, and thereby less dependent upon hardware-specific function such as determining appropriate behavior from a set of fault events.

SUMMARY OF THE INVENTION

A hardware subsystem is provided which detects at least one of a plurality of events in the hardware indicative of and corresponding to fault conditions in a computer system. Such events might include detection of power loss, a primary or secondary cooling fan failure, a thermal failure, or the like.

The hardware system further includes means for determining, as a function of and corresponding to such detected events, an appropriate behavior response for the system. Such behavior might include, for example, provision for merely warning the system operator of a cooling or power problem when not severe. Other behavior might include automatically effecting a computer system shutdown over a ten minute period (in response to events interpreted by the hardware subsystem as a severe cooling problem), shutdown over a more limited period of, say, 20 seconds (in response to events so interpreted as a very severe cooling problem), or immediate power down in the case of a severe condition such as loss of power.

When the appropriate such desired reactive behavior (driven by the particular detected events) has been determined by the hardware system, a message is communicated to the operating system of the computer system identifying the desired responsive behavior.

In response to receipt of this message by the operating system, the operating system thereafter causes execution of appropriate subroutines to effect the desired responsive behavior, whether it be immediate power down, or one of the other preselected behaviors.

A specified behavior from the hardware subsystem might desirably result in the behavior of a plurality of responsive actions to be effected by the operating system. For example, in response to a desired 20 second shutdown behavior communicated to the operating system by the hardware subsystem as a result of detection of certain events, the desired behavior might in fact be a subset of behaviors, including completing and storing to disk all end-process transactions, thereafter appropriately commencing power system shutdown while monitoring for restoration of power (in which case disk activity would be resumed) and the like.

It is an important feature of the invention to avoid a requirement that the operating system itself be modified to recognize new events and determine what behaviors are necessary and appropriate for such events sensed by the hardware. Thus, in a preferred embodiment of the invention, instead of the hardware system merely notifying the operating system of one or more events (such as loss of power, loss of a fan, etc.), the hardware system and/or subsystems, on the contrary, provides notification to the operating system of a desired behavior (e.g., user warning, slow ten minute system shutdown, immediate power down, etc.).

In accordance with the teachings of the invention, this provision to the operating system of an indication of the desired behavior (as opposed to events) thereby enables the operating system to be freed from the responsibility of recognizing an event and determining the appropriate behavior as well. In this manner, new hardware and fault conditions may be supported without necessitating modification and testing of the operating system software per se. The new hardware events are each simply presented again to the operating system as one of the pre-existing desired behaviors already known to the operating system.

DETAILED DESCRIPTION OF THE PREFERRED EMBODIMENT

Figure 1:
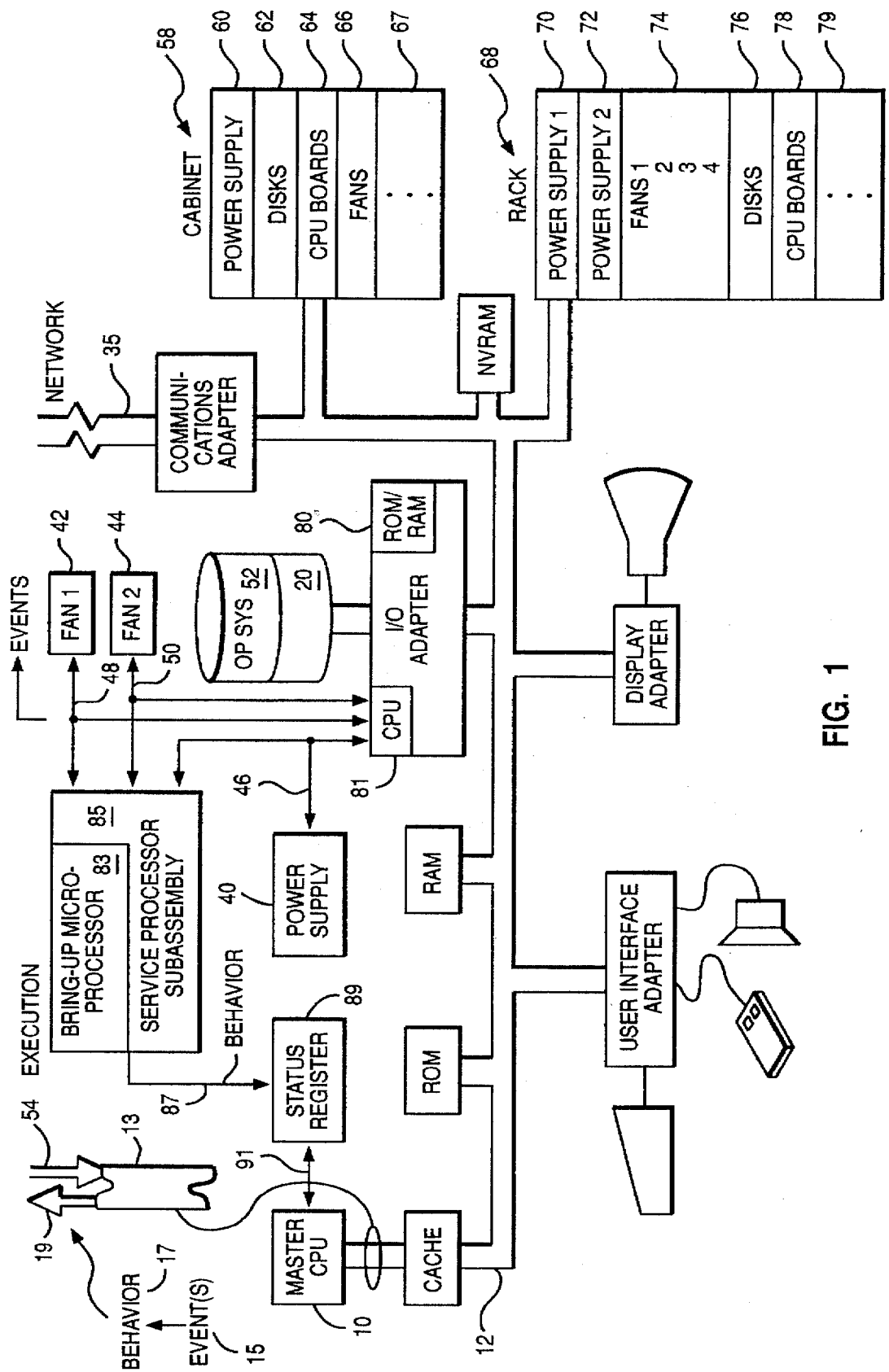
FIG. 1 is a block diagram of a computer system including the fault management subsystem of the present invention.

FIG. 1 depicts a high level block diagram of a representative computer system 100 implementing the invention. Computer 100 includes a master central processing unit (CPU) 10, including an IBM PowerPC™ 601, and Intel™ Pentium microprocessor or the like for processing data and code contained in a processing cache 15, random access memory (RAM) 14, read only memory (ROM) 16, non-volatile RAM (NVRAM) 32, and in other appropriate storage such as DASD 20, controlled by an I/O adapter 18. Conventionally a variety of other storage media may also be employed, including tapes, CD-ROM and worm drives. Removable storage media may also be provided to store data or computer process instructions as desired.

In the preferred embodiment, an IBM RISC System/6000™ executing the AIX™ operating system 52 comprise the computer system 100 of FIG. 1. However, one skilled in the art readily may recognize that other hardware platforms and operating systems may be utilized to implement the present invention.

Users communicate with the computer system 100 through various I/O devices (such as user controls and interfaces well known in the art controlled by an appropriate user interface adapter 22). A display 38 displays information to the user, while keyboard 24, pointing device 26, and speaker 28 allow the user to direct operation of the computer system. A communications adapter 34 of conventional design may also be provided to control communication between this computer and other processing units connected to a network 35 as desired. A display adapter 36 controls communication between the user and the system 100 as presented on the visual display 38 in a conventional manner. Also in a conventional manner, a bus structure 12 is provided interconnecting the various subassemblies and components of this system to effect transfer of data, address, and control signals between the various subcomponents.

Still referring to FIG. 1, the system 100 will further include one or more power supplies 40, and some form of cooling mechanisms such as the fans 1 and 2, 42–44. It is a feature of the invention to provide for systems 100 that are in a wide variety of configurations including differing components in terms of number, type, and function. These differing systems may also take different overall physical forms, such as being housed within a cabinet or rack, respectively shown as cabinet system 58 and rack system 68 generically. It will further be seen that even when the system 100 is embodied in these differing forms, they will nevertheless typically generally include the previously described subassemblies and components.

Thus, referring to the cabinet system 58, for example, it will be seen to include one or more power supplies 60, storage devices 62 such as RAM, ROM, DASD, NVRAM, etc., one or more CPU boards 64, one or more fans, 66, and various other components as desired shown generically as block 67.

In like manner, a rack system 68 might, in like manner, include one or more power supplies 70, 72, fans 74, storage devices in the form of disk drives, etc. 76, processor boards 78, and other components 79. All such subassemblies and components will also, in like manner to the first described components of the system 100 include appropriate bus structures 12 interconnecting the various subcomponents and providing the necessary data, address and control signals.

The hardware of FIG. 1 is actually comprised of multiple subsystems which may include their own processors and memory. This is intended to be depicted in a general sense, for example, by the I/O adapter card 18 which includes a CPU 81 and ROM 80, although in a generic sense, it is intended to simply represent any subsystem of the computer system 100 containing dedicated processors and memory. One example of such an additional subsystem and processor in addition to that of the master CPU(s) 10 and CPU 81 is a "bringup" microprocessor 83 in service processor subsystem 85. The bringup microprocessor will perform the tasks of bringing up the system 100 at initial boot. Additionally, it will monitor the various fault conditions and events, and determine the appropriate behavior code to communicate to the operating system 53. This will be described in greater detail hereinafter.

In accordance with the teachings of the invention, one function of such additional CPUs 81 and associated memory 80 is to monitor the various operating conditions of their respective subsystems of system 100 to detect "events" which the system 100 must respond to. In FIG. 1, signal lines 46, 48, and 50 are shown running between the power supply 40—CPU 81, first fan 42—CPU 81, and second fan 44—CPU 81, respectively. These signal lines 46–50 are intended only to conceptually illustrate that various events associated with subsystems of the system 100 may be sensed by these additional CPUs 81 (not necessarily a CPU on I/O adapter 81 but rather a CPU associated with the particular monitoring subassembly power supplies only for convenience). As a specific example, in operation of the system 100, at some point one or more of the power supplies 40 or 60, 70, 72, (with respect to the cabinet and rack systems 58, 68) may in some way become defective—either operating out of tolerance levels or experiencing a complete failure. The power supply subsystem is so designed as to generate an event signal 46 indicating this failure condition or event which will be communicated to an appropriate CPU 81.

In like manner, the system 100 may at some point experience a cooling problem which may be manifested by malfunctioning of one or more fans 42, 44, 66, 74, etc. These events, in like manner to power supply events, will be represented by appropriate event signals 48, 50 which are communicated to the appropriate CPU 81 (again shown as I/O adapter CPU 81 only for convenience).

In accordance with prior art systems, once these events 46–50 had been sensed by the CPU 81, the events were simply stored in a storage register of the system 100. It was then the responsibility of the CPU 10 and the associated operating system 52 to sort out what the appropriate responsive behavior should be in response to the particular event or events stored in the register. As an example, if the CPU 81 sensed a catastrophic power supply 40 failure event as seen on line 46, it was then the responsibility of the operating system 52 and CPU 10 to determine what appropriate behavior was dictated from this event, namely effecting a transfer to backup battery power, or the like.

Similarly, in response to an event signal 48, or 50 sensed by the CPU 81 and stored in an appropriate register, the CPU 10 and operating system 52, in response to being made aware of such event (indicating failure of, for example, the first fan 42), might fashion an appropriate responsive behavior. This might be in the form of a mere message on the display adapter 38 to the operator that a fan had failed. No other further action might be dictated in the short term due to the redundancy provided by additional fans such as fan 44. On the other hand, if event signals 48 and 50 sensed by the CPU 81 indicated that both fans 42–44 had failed, this might dictate another behavior, e.g, effecting a system shutdown before a thermal overload condition resulted.

Again, however, in prior art systems it was the responsibility of the CPU(s) 10 and the operating system 52, in response to detecting these event signals stored in an appropriate storage register, to fashion the appropriate desired behavioral response itself.

As an illustration of the problems this prior approach presented, it will be noted that the operating system 52, for economical reasons, is often intended to support multiple different hardware systems 100 having many differing types of subsystems and corresponding events. Specifically, for example, in one such hardware system, presence of a bit or flag in the aforementioned storage register at a particular location might indicate a failure of a fan 42. This in turn might dictate a particular behavioral response of the system such as a mere warning to an operator as previously described.

However, in another such system 100, this very same bit might reflect the aforementioned failure of the power supply 40 which, in turn, would dictate the need for a response from the system 100 entirely different from that of a fan failure. It was the responsibility of the particular operating system 52 in prior art systems to not only have to sense the particular event but also to determine the corresponding appropriate behavior which it should dictate. In the present case under consideration, given that the identical bit in a storage register might represent two entirely different events and two corresponding entirely different behaviors which should be effected in response, the necessity devolved upon the operating system 52 to sense which type of hardware system 100 was being operated in order to correctly "decode" the storage register bit, e.g., to determine which appropriate responsive behavior was required.

It should be readily apparent that this, in turn, required constant modification and testing of the operating system 52 so that it could always be determining the appropriate behavior to effect, dependent of course upon which particular collection of hardware components it was called upon to support. This, in turn, practically resulted in essentially the need for designing, operating, and maintaining what amounted to multiple operating systems. This, in turn, resulted from the need to change the operating system to map the event-driven behaviors it fashioned so that they would correspond to each different hardware system generating these events.

In response to these aforementioned problems, it is a feature of the invention to offload onto hardware system and subsystems per se this determination of the appropriate behavioral response to events. In this manner, what is communicated to the CPU 10 and operating system 52 is not the event or events per se in need of a responsive behavior. Rather an indicator is communicated of the desired behavior itself (selected from a preselected list of such desired behaviors known by the operating system and which the operating system is capable of effecting). In this manner, when a hardware system 100 configuration is changed in any manner, (addition, deletion, or change of any hardware subsystem or the like), there is no necessity, unlike in the prior art, to convey these changes to the CPU and operating system 52 (as well as their significance in changing the pre-existing behavior strategy already embodied in the operating system 52). On the contrary, the hardware systems 100 and associated subsystems per se would assume the responsibility of predetermining a desired behavioral response known to the operating system in response to detected event conditions. Only the desired behavior could be converged to the CPU 10 and operating system 52, not the events.

This, in turn, resulted in a major advantage afforded by systems of the present invention, namely obviating the need to maintain multiple operating systems for differing hardware platforms. Essentially one operating system could now support multiple hardware configurations without the necessity to continually modify and test the operating system to provide the correct behavioral response to the events which varied in response to varying hardware configurations.

The portion 13 of the bus 12 shown in FIG. 1 is intended conceptually to illustrate this interplay of events and behaviors. More particularly, as previously described, events 15 detected by the hardware subsystems and their respective CPUs, cause the selection by the CPUs of a particular desired behavior 17 selected from a preselected set of behaviors. Arrow 19 is intended to reflect that this desired behavior 17 is communicated over the bus 12 to the central CPU complex 10. The complex 10, in response thereto, determines in conjunction with the operating system 52 which calls are necessary, in response to the behavior indication 17, to effect the necessary corresponding execution 54 of routines effecting the behavior 17. The directions of the arrows 19 and 54 are intended to reflect that CPU 10 and operating system 52 are informed of the desired behavior 17 from the hardware subsystems and that, in response thereto, the CPU 10 and operating system 52 generate appropriate signals on the bus 12 (shown by arrow 54). Those signals effect execution of the desired behavior in the system 100 (such as system shutdown, invocation of battery backup, messages on display 38 to users and/or system administrators, suspension of disk operation, and the like. It will be recalled that the events 15 are actually sensed by the various subsystems and their corresponding CPUs, such as the service processor block to be described, and it is these subsystems which generate the behavior signal 17 as a function of the events 15 which they sense, and this behavior signal 17 is what is communicated from the subsystem(s) to the master CPU complex 10 which in conjunction with the operating system 52 effects the necessary execution 54 of appropriate subroutines responsive to the behavior signal.

For the sake of clarity, although for general purposes the I/O adapter, which is essentially a disk controller, was selected as the controller to also conceptually and generically indicate the function of a service processor and event detection, perhaps it is more clear to illustrate this separate function by a separate functional box captioned in FIG. 1, service processor subassembly 85. This subassembly is what will actually include the bring up microprocessor 83, which is essentially a service processor which performs the tasks of bringing up the system, monitoring the various fault conditions and events, and determining the appropriate behavior code to send to the operating system. Thus, the events sensed from the power supply 40, fans 42, 44, etc. are shown in the figure as actually being delivered to the service processor subassembly 85. These inputs to the subassembly 85 are processed by the bringup microprocessor 83 whereupon the system provides an output 87 which may be recognized as representing the transformation of the events on lines 46, 48, 50, to signals representing the desired behavior. This behavior signal 87 will then preferably be delivered to an appropriate status register 89. It is this status register 89 which is in fact read by the master CPU 10 upon detection of a power warning interrupt, whereupon the CPU 10 and operating system 52, in response to this behavior signal stored in the status register 89 will generate the appropriate execution 54 of the subroutines(s) necessary to effect the desired behavior in the system.

Figure 2:
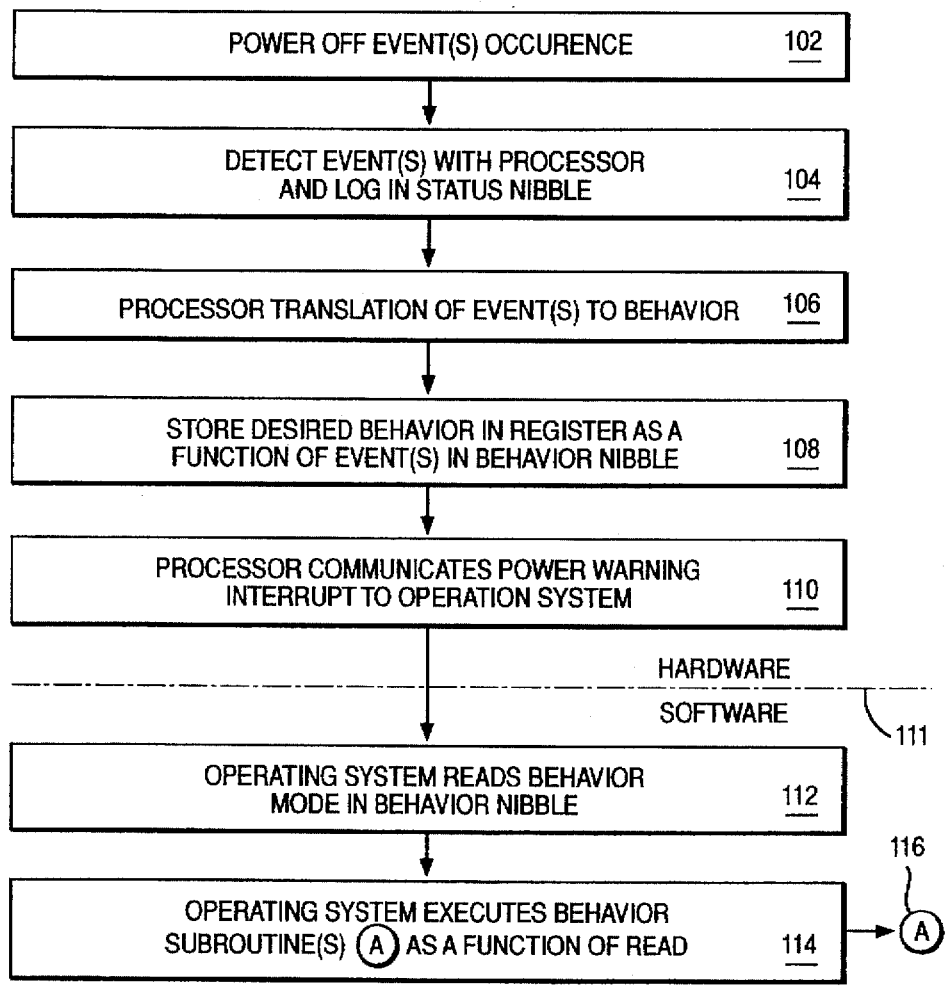
FIG. 2 is a flow diagram of the operation of the fault management subsystem of the present invention in the computer system of FIG. 1.

Turning now to FIG. 2, depicted there is a flow diagram illustrating the flow of software control of the system 100 of FIG. 1 in accordance with the invention. Conceptually it will be noted that a dividing line 111 has been provided which is intended to illustrate that functions above the line 111 are intended to be performed by the hardware system and subsystems per se and their associated CPUs and memory whereas the functions depicted below the line 111 are carried out in the operating system software 52 and CPU 10 functions.

First, in operation of the invention, the system 100 will detect that an event has occurred within the system in need of an appropriate behavior response, shown at block 102. Such an illustrative event might be the familiar event associated with event signal 48 of a cooling problem such as a fan 42 failing. When this event occurs, 102, it will then be detected as an event signal such as 46–50 by a subsystem CPU 81 and logged in appropriate storage, shown at block 104. Each event or events will have associated therewith an appropriate behavior known to the operating system 52 which varies with the event or events and the particular hardware giving rise to them.

This list of predetermined desired behaviors and the corresponding strategy for selecting one of the behaviors as a function of the sensed event(s) will be pre-stored in the subsystems such as in the ROM/RAM 80. The subsystem CPU 81 will then access the stored indication of the particular event(s) 46–48 and will further access the pre-stored code and data which, when executed, will result in a determination of the necessary desired behavior. Thus an indication of this desired behavior is generated, e.g., the CPU 81 will translate these stored and detected events to a specific desired pattern of behavior, shown at block 106. This indicator of desired behavior will then be appropriately stored in a storage register such as the RAM 80, this step being shown as block 108 in FIG. 2. An appropriate interrupt will then be communicated by the CPU 81 to the operating system 52, shown at block 110. The operating system is thereby provided with an indication that the hardware subsystems have detected one or more events in need of a response by the operating system 52 and that an indicator of the appropriate desired behavior is available to the operating system 52 in a known storage register location.

Still referring to FIG. 2, in response to handling this interrupt shown at block 110, the operating system 52 will then access an indication of the appropriate desired behavior mode which was stored in a register upon execution of the function associated with block 108. A representative example behavior might be a bit or flag set in the storage register which indicates to the operating system that the required behavior is only a warning to the user on the display screen 38 that a non-critical cooling problem (event) has occurred but that due to redundant cooling fans, there is no need for an immediate system shutdown. In response to the operating system handling the interrupt and accessing the indicator of the desired predetermined behavior known to the operating system and which the operating system is expected to effectuate, the operating system, in turn, will then cause execution of an appropriate subroutine 116 to effect the behavior. This step of the operating system effecting execution of the subroutine 116 is shown at block 114.

Figure 3:
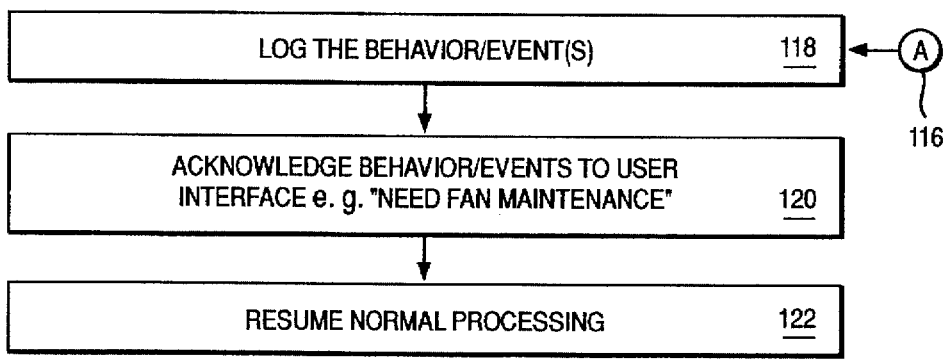
FIG. 3 is a more detailed flow diagram of aspects of operation of a representative fault management subsystem of the present invention shown in FIG. 1.

Turning to FIG. 3, depicted therein is a high level block diagram of a representative behavioral subroutine which might be executed by the operating system 52 and CPU 10 in response to the operating system handling an interrupt communicated at block 110. The operating system, after accessing the indicator of the desired behavior mode, 112, then effects the execution at 114 of the appropriate subroutine 116 dictated by the particular indicator of the desired behavior. Specifically, continuing with the current illustration, the subroutine is entered at 116, whereupon the indicated behavior is logged, 118, e.g., the condition is communicated to the user or operator on the display screen 38 and stored. Next, an acknowledgement may occur, 120, in the subroutine that the desired events and behavior have been reported to the user, whereupon the operating system 52 will then effect resumption of normal processing 122.

It should readily be apparent that the operating system 52 may effect the desired predetermined behavior subroutine 116 responsive to a corresponding appropriate indicator from the hardware system or subsystem that this particular behavior is desired. It is thus completely within the control of the hardware system and subsystem designers to determine which events to detect, and which event or combination of events should be caused to trigger an indicator to be communicated to the operating system 52, of which of the predetermined behaviors the operating system is going to be expected to implement responsive to these detected events. Thus, the invention is not intended to be limited in any way to any particular event or combination of events, or responsive behavior to be triggered by the operating system. Rather, the invention admits to any desire preselected list of behaviors, subroutines, and corresponding events triggering them as deemed appropriate by the particular hardware system and subsystem designer. An important feature to note is that it is these desired subroutines or behavior indicators which are communicated to and accessed by the operating system per se rather than the underlying events themselves.

It will be noted that neither is the invention intended to be limited to any particular set of predetermined behaviors, but rather these behaviors will be determined by the particular components and design of the system 100 itself. As an illustration, one such system 100 might have certain components which, upon detection of a particular event or events, might warrant merely a warning to a user or administrator of a cooling problem or power problem. Detection of yet another event or combination of events (such as failure of one of multiple fans) might warrant a desired behavior wherein the system 100 will be shut down after ten minutes and a warning of a severe cooling problem provided to the user, thereby giving the system time to more gracefully terminate disk operations and the like. Still a further set of event conditions detected by the hardware (such as failure of all fans) might, for the given system 100, warrant a different behavior of a shutdown within 20 seconds and an error message of a very severe cooling problem. Still a further set of detected events might warrant a desired behavior wherein there is an immediate powerdown condition as, for example, in the case of a catastrophic power loss.

In each such case of a desired behavior dictated by a particular set of events, it is an important feature of the invention that a behavior code is preselected for each such desired behavior and it is this resultant behavior code and not the events giving rise to it which is communicated to and operated upon by the operating system 52 being operated by the master CPU processor 10.

While the invention has been shown and described with reference to particular embodiments thereof, it will be understood by those skilled in the art that the foregoing and other changes in form and detail may be made therein without departing from the spirit and scope of the invention.

We claim:

1. A computer-implemented method for efficiently managing system shutdowns responsive to hardware faults in a computer system comprised of hardware subsystems, a master processor complex, and an operating system, comprising the steps of:

defining a plurality of sets of events, each of said sets corresponding to one or more of said events and a different one of said hardware faults;

defining a plurality of behaviors to be executed by said operating system, each corresponding to one of said sets of events;

detecting occurrence of one of said sets of events in said computer system;

selecting, as a function of said detecting, a corresponding one of said behaviors;

communicating to said operating system, in response to said selecting, a representation indicating said corresponding one of said behaviors; and executing said corresponding one of said behaviors by said operating system in response to said communicating.

2. The method of claim 1 wherein said events comprise hardware faults in one or more of said hardware subsystems.

3. The method of claim 2 wherein said step of detecting occurrence of said one of said sets of events is performed by said one or more hardware subsystems.

4. The method of claim 3 wherein said step of selecting said corresponding one of said behaviors is performed by one of more of said hardware subsystems.

5. The method of claim 4 wherein said behaviors comprise user warnings and different routines for causing said system shutdowns.

6. The method of claim 5 further including adding an additional hardware subsystem to said system; and defining a new set of events to said plurality of sets of events in response to said adding said additional hardware subsystem.

7. The method of claim 6 wherein at least one of said plurality of behaviors corresponds to said to said new set of events.

8. The method of claim 7 wherein at least one of said plurality of behaviors corresponds to two or more of said sets of events.

9. The method of claim 8 wherein said routines for causing said system shutdown each shut said system down during a different length of time.

10. The method of claim 9 further including starting a timer for a preselected interval in response to said detecting occurrence of said one of said sets of events;

detecting if said one of said sets of events whose occurrence was detected, changes during said preselected interval; and aborting said corresponding one of said behaviors in response to said detecting.

11. A computer-implemented apparatus for efficiently managing system shutdowns responsive to hardware faults in a computer system comprised of hardware subsystems, a master processor complex, and an operating system, comprising:

means for defining a plurality of sets of events, each of said sets corresponding to one or more of said events and a different one of said hardware faults;

means for defining a plurality of behaviors to be executed by said operating system, each corresponding to one of said sets of events;

means for detecting occurrence of one of said sets of events in said computer system;

means for selecting, as a function of said detecting, a corresponding one of said behaviors;

means for communicating to said operating system, in response to said selecting, a representation indicating said corresponding one of said behaviors; and means for executing said corresponding one of said behaviors by said operating system in response to said communicating.

12. The apparatus of claim 11 wherein said events comprise hardware faults in one or more of said hardware subsystems.

13. The apparatus of claim 12 wherein said means for detecting occurrence of said one of said sets of events includes said one or more hardware subsystems.

14. The apparatus of claim 13 wherein said means for selecting said corresponding one of said behaviors includes said one or more hardware subsystems.

15. The apparatus of claim 14 wherein said behaviors comprise user warnings and different routines for causing said system shutdowns.

16. The apparatus of claim 15 further including means for adding an additional hardware subsystem to said system; and means for defining a new set of events to said plurality of sets of events in response to said adding said additional hardware subsystem.

17. The apparatus of claim 16 wherein at least one of said plurality of behaviors corresponds to said to said new set of events.

18. The apparatus of claim 17 wherein at least one of said plurality of behaviors corresponds to two or more of said sets of events.

19. The apparatus of claim 18 wherein said routines for causing said system shutdown each shut said system down during a different length of time.

20. The apparatus of claim 19 further including means for starting a timer for a preselected interval in response to said detecting occurrence of said one of said sets of events;

means for detecting if said one of said sets of events whose occurrence was detected changes during said preselected interval; and means for aborting said corresponding one of said behaviors in response to said detecting.

\* \* \* \* \*